United States Patent [19]
Watson

[11] Patent Number: 4,538,218
[45] Date of Patent: Aug. 27, 1985

[54] SKYLIGHT SENSOR AND CONTROL SYSTEM

[75] Inventor: Francis M. Watson, York, Canada

[73] Assignee: Honeywell Ltd., Canada

[21] Appl. No.: 548,522

[22] Filed: Nov. 3, 1983

[30] Foreign Application Priority Data

May 20, 1983 [CA] Canada ................................. 428593

[51] Int. Cl.³ .............................................. F21S 11/00
[52] U.S. Cl. .................... 362/802; 362/295;
315/159; 350/258; 356/222; 356/230
[58] Field of Search ................. 362/32, 145, 147, 148,
362/295, 362, 802, 276; 350/258; 315/149, 159;
340/870.29, 501; 250/211 R, 211 K; 356/218,
220, 222, 230

[56] References Cited

U.S. PATENT DOCUMENTS

| | | | |
|---|---|---|---|
| 3,488,505 | 1/1970 | Jentaft et al. | 350/258 |
| 3,694,690 | 9/1972 | Shimizu et al. | 315/149 |
| 3,962,600 | 6/1976 | Pittman | 315/159 |
| 4,008,415 | 2/1977 | De Avila-Serafin et al. | 315/159 |
| 4,110,049 | 8/1978 | Younskevicius | 356/222 |
| 4,122,334 | 10/1978 | Owens | 315/159 |
| 4,182,573 | 1/1980 | Yamada | 356/218 |
| 4,340,812 | 7/1982 | Mori | 350/258 |
| 4,355,896 | 10/1982 | Laue | 356/222 |
| 4,362,970 | 12/1982 | Grady | 315/159 |
| 4,383,288 | 5/1983 | Hess, II et al. | 362/319 |
| 4,410,930 | 10/1983 | Yachabach | 362/802 |

OTHER PUBLICATIONS

Energy Saver for Industrial Lighting, NASA Technical Briefs, vol. 4, No. 3 (Fall 1979).

*Primary Examiner*—Parshotam S. Lall
*Assistant Examiner*—W. R. Wolfe
*Attorney, Agent, or Firm*—Trevor B. Joike

[57] ABSTRACT

A lighting control system is provided which utilizes a light responsive sensor means and a control system to respond to the skylight illumination while rejecting direct sunlight as a control parameter. The skylight illumination level is used to control lighting power controllers that can dim interior lighting equipment in a defined pattern to maintain a uniform light level at a work surface and to conserve electrical energy.

15 Claims, 6 Drawing Figures

SKYLIGHT SENSOR AND CONTROL SYSTEM

BACKGROUND OF THE INVENTION

Two characteristics have been observed on the effects of daylight entering a building through a conventional fenestration as applied to lighting control. These two characteristics, skylight and direct sunlight, involve two components of the daylight that are present in the light that enters the fenestration. The skylight component normally can be utilized effectively to light the work plane with a minimum upset to human comfort. However, the direct sunlight component has adverse effects on human comfort in that it produces very strong light contrast and radiant heat, both objectionable to human comfort. For these reasons, curtains or blinds are normally included on the windows to eliminate the objectionable sunlight effects. Curtains with partial transparency may be drawn by the occupants, or venetian type blinds adjusted to redirect the sun's rays away from the work plane. However, once the direct sunlight has left the building's exposure due to the sun's reorientation, the occupants normally open their curtains or drapes as they prefer the human eye comfort present when the eye is allowed to look at both close and distant objects.

Under conditions where daylight enters a room, the useful light on the work plane from the skylight component of the daylight is greatest close to the windows, and as one moves into the room away from the windows, the light level on the work plane progressively diminishes based on the light dispersal characteristics of the room. Thus, when daylight is available to reduce the artificial lighting system power load, the artificial lights closest to the windows may be progressively dimmed to a lower level than those at a greater distance from the windows.

SUMMARY OF THE INVENTION

The present invention is based on the assumption that the curtains or blinds will be closed or adjusted when direct sunlight is present. Daylight to a lesser extent is still present under these conditions and can be utilized as an energy saving technique to reduce the artificial lighting. The usable amount will depend on the transparency of the curtains or on the blind orientation during these conditions.

The present invention offers a means to measure the total daylight in a full sky envelope (or in one direction in the sky), and within the measured section, to obtain daylight signals based on smaller areas of the observed sky. The individual signals are then conditioned in a discriminator unit which is set (or programmed) to either remove the strongest signals (those with direct sunlight) or to reduce their relative strength and to combine the remaining signals in proportional or average form so as to provide an output signal from the discriminator tuned to the curtain transparency factor or normal blind orientation. During periods when direct sunlight is not present (when the curtains or blinds are open), the discriminator automatically provides a signal representation of the skylight available.

The invention can include two other desirable features. One is the inclusion of an auxiliary input signal means to provide the discriminator with a signal which acts to modify the resultant output from the discriminator based on auxiliary or secondary information such as time of day, season, sun angle, etc. The second modification includes a dispersal compensator means which is a unit that allows adjustment of the output signal from the discriminator to a proportionately lower level based on the distance of the lighting fixtures from the windows and on the light dispersal characteristics of the particular area covered by the controlled artificial light.

The present invention tends to eliminate the objectionable effects due to direct sunlight and due to diminished dispersal light levels with distance from the fenestration. This objectionable effect may be minimized in the lighting control system by using a control signal based mainly on the skylight component of the daylight, and by scaling the resultant control signal based on the distance factor that the artificial light fixtures are located in from the windows. Additionally, stable control of the light fixture output is provided based on the skylight intensity, whereas stable fixture light output is not possible when direct room light sensors are employed in conjunction with curtains or blinds which are occupant adjusted.

In accordance with the present invention, there is provided a skylight sensor for the control of the interior illumination of an area having fenestration means and controllable artificial light source means, including: light sensor means having an active area adapted to be mounted so as to expose said active area to the exterior of said fenestration means; said light sensor means including a plurality of adjacent segments with said segments shielded from each other so that each of said segments form light gathering means; a front portion for each of said segments and a corresponding rear portion for each of said segments; said front portion of each of said segments exposed to the exterior of said fenestration means; and said rear portion of each of said segments including light responsive means collecting light from said active area.

In accordance with the present invention, there is also provided a skylight sensor and control system for the control of the interior illumination of an area having fenestration means and controllable artificial light source means, including: light sensor means having an active area adapted to be mounted so as to expose said active area to the exterior of said fenestration means; said light sensor means including a plurality of adjacent segments with said segments shielded from each other so that each of said segments form light gathering means; a front portion for each of said segments and a corresponding rear portion for each of said segments; said front portion of each of said segments exposed to the exterior of said fenestration means; said rear portion of each of said segments including light responsive means collecting light from said active area; discriminator means including input connection means connected to said light responsive means, and said discriminator means further having output means; said discriminator means providing said output means with a voltage from the light responsive means having the lowest level of illumination; and lighting power controller means adapted to control said artificial light source means to lower the level of illumination from said artificial light source means in response to an increase in the light at said light sensor means.

DESCRIPTION OF THE PREFERRED EMBODIMENTS

Figure 1:
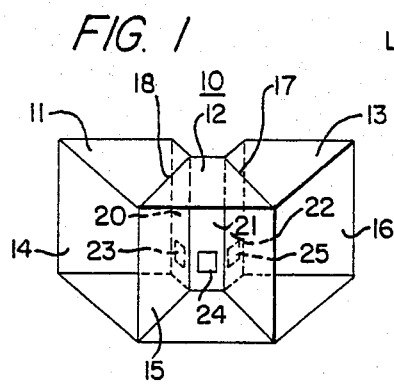
FIG. 1 is a pictorial view of the novel skylight sensing device.

In FIG. 1 a skylight sensor or light sensor means 10 is disclosed having a plurality of adjacent segments 11, 12, and 13. These adjacent segments are trapezoidal in cross section and form a light sensor means having three front or active surface areas 14, 15, and 16 that are designed to be directed at or through the fenestration or wall of the building which is exposed to sunlight. The active areas 14, 15, and 16 are pointed away from the building either through the fenestration, or at an outer surface of the fenestration. The plurality of adjacent segments 11, 12, and 13 are shielded from each other by a pair of walls 17 and 18. The wall 18 separates segments 11 and 12, while the wall 17 separates the segments 12 and 13.

The active areas 14, 15, and 16 form the front portion of the segments and each has a corresponding rear segment 20, 21, and 22. The rear portions of the individual segments are shown as having smaller areas on which are mounted light responsive means 23, 24, and 25. The light responsive means 23, 24, and 25 can be one or more photo voltaic or photo resistive cells. Dependent on the type of system into which the skylight sensor is placed, the transmission of the information from the sensor 10 can be by either electrical or fiber optic means (not shown). The mounting of the skylight sensor 10, and the type of transmission means will vary from installation to installation, and can use any commonly available and well known means.

The skylight sensor means 10 can be made up of any number of adjacent segments. A minimum of two segments is required and the total number of segments can be selected according to a particular application of the skylight sensor. For the purposes of the balance of the disclosure of this invention, the skylight sensor 10 will be described as having three adjacent segments as that number provides a convenient vehicle for the description of the operation of the skylight sensor and the control system into which it operates. While the skylight sensor 10 has been shown with a plurality of segments wherein the front portion of each segment is larger than the rear portion, a skylight sensor could be developed which utilizes adjacent segments that are shielded from one another that have other relationships between the front and rear portions. The configuration specifically shown is one that minimizes the area required for the light sensor 10 and provides for good functional operation.

Figure 2:
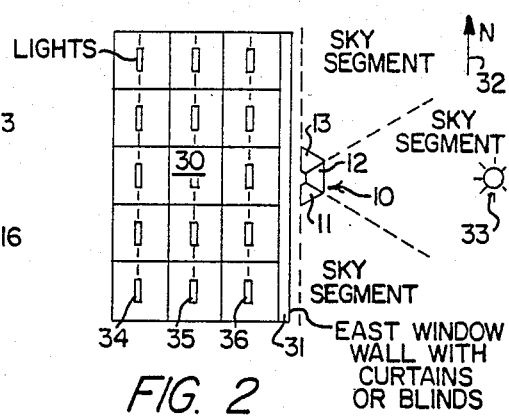
FIG. 2 is a plain view of a typical room employing the invention.

In FIG. 2 there is disclosed a plan of a typical room 30 having fenestration means or an outer wall 31. This particular wall is disclosed as an east window wall of a building as can be identified by the north vector 32, and the representation of the sun 33. The skylight sensor means 10 is disclosed having the three segments 11, 12, and 13 each which views a different segment of the sky. The room is completed by three rows of lights 34, 35, and 36. The row 36, being closer to the window wall 31, obviously receives more natural light than an area under the row 34 which is the most remote row from the window wall 31. The window wall typically would include curtains or blinds that can be adjusted by the occupants of the room for convenience in admitting sunlight when that light is available. When the light is available it is desirable to reduce the illumination within the room 30 for both the comfort of the individuals and for energy conservation purposes.

Figure 3:
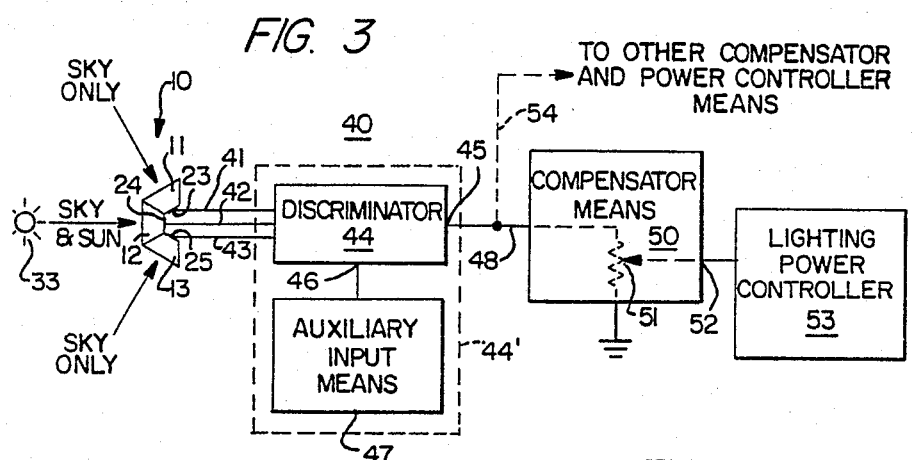
FIG. 3 is a schematic representation of the sensor incorporated in a control system.

In FIG. 3 there is disclosed a light sensor means or skylight sensor 10 applied to a control system schematically disclosed at 40. A three segment skylight sensor or light sensor means 10 is again disclosed with segments 11, 12, and 13 generally directed at the sky and sun 33. With the three segment light sensor means 10, the direct sunlight basically impinges on only one of the light responsive means 23, 24, or 25, while the light responsive means 23, 24, and 25 respond to the skylight illumination. As such, the light responsive means 23, 24, and 25 each have different output potentials or levels of energy. In the disclosure of the system of 40, the light responsive means 23 is connected by a conductor 41 to a discriminator 44. The light responsive means 24 is connected to the discriminator 44 by conductor 42, while the light responsive means 25 is connected by conductor 43 to the discriminator 44.

The discriminator 44 has the conductors 41, 42, and 43 as input means, but only has a single output means 45. The output means 45 transmits a voltage from the discriminator 44 representative of the lowest of the levels contained on the input conductors or input means 41, 42, and 43. The reason for this will be discussed later. The discriminator 44 further has a second input at 46 from an auxiliary input means 47. The auxiliary input means 47 adjusts the discriminator 44 based on data or secondary information such as time of day, season of the year, sun angle, etc. The auxiliary input means 47 could be a simple electromechanical clock of the type commonly used to generate on-off time data based on the season of the year, and is extensively used for the control of exterior and interior lighting.

The discriminator 44 and the auxiliary input means 47 in reality form the discriminator means 44' and can be conventional electronic circuitry or could be a programmed microprocessor control unit capable of receiving sophisticated auxiliary input data for the discriminator 44. In its simplest form, the auxiliary input means would be some type of clock, and the discriminator 44 would be an electronic circuit capable of selecting the lowest input signal and providing it at 45 as an output signal.

The output signal at 45 is provided at a conductor 48 to compensator means 50, which has been shown simply as a potentiometer 51 that can be adjusted to pick off at 52 whatever proportion of the output signal 45 as is needed to operate a lighting power controller disclosed at 53. The lighting power controller 53 would be any type of controllable light dimming equipment that in turn could be connected to one of the strings of lights 34, 35, or 36 of FIG. 2. This will be explained in more detail in connection with FIG. 6. The compensator means 50, and the lighting power controller 53, could be enclosed in one unit, or the compensator means 50 could be part of the equipment mounted with the light sensor means 10 and the discriminator means 44', as will be shown in FIGS. 4 and 5. To complete FIG. 3, additional conductors 54 are shown which can be provided as inputs to additional compensators and power control units as are necessary for the number of rows of lights in the particular area being controlled. This will also be brought out in connection with FIGS. 4, 5, and 6.

The operation of the skylight sensor and control system disclosed in FIG. 3 can best be understood by providing some examples of numerical values involved. If it is assumed that the light sensor means 10 is positioned so that the sun 33 primarily strikes segment 12, segments 11 and 13 will be exposed primarily to the skylight, and will have lesser outputs at their light responsive means 23 and 25. If the sun is striking the segment 12, the light responsive means 24 might typically have a ten volt output that would be indicative of both skylight and direct sunlight. In this example, the light responsive means 23 is exposed primarily to skylight, and would have a five volt output. The light responsive means 25 would also be primarily directed at skylight and is assumed to have an output voltage of six volts. These voltages are all communicated to the discriminator means 44' and primarily to the discriminator 44 itself. The discriminator 44 removes the highest two voltages applied thereto and passes through the lowest of the voltages. As such, the output at 45 would be five volts, and thus would be representative only of a skylight illumination. The voltage is provided on conductor 48 to the compensator means 50 where a proportion is picked off by the potentiometer 51 and provided as an output at 52. The output at 52 directly controls a light dimming device identified as a lighting power controller 53 that in turn controls one row of lights.

It can be seen that as the sun 33 shifts with respect to the position of the light sensor means 10, that the outputs of voltage at the light responsive means 23, 24, and 25 shift in magnitude depending on which of the segments 11, 12, or 13 has a direct sunlight exposure or a partial sunlight exposure. As the shift occurs, the discriminator 44 keeps selecting the lowest value of voltage being conducted on means 41, 42, and 43 so that the output voltage at the output means 45 always responds to the skylight and not the direct sunlight itself. As was indicated earlier, the discriminator 44 can be modified by an auxiliary input means 47 so that the overall discriminator means 44' can be characterized or programmed to allow for time of day, seasons of the year, or other factors involved in the particular lighting system.

Figure 4:
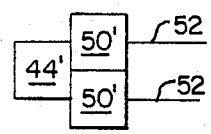
FIGS. 4 and 5 are two modifications of components within the control system.

In FIG. 4 the discriminator means 44' is again shown, but in this case the discriminator means 44' is directly mounted with two compensator means 50' to provide two output means 52 that are in turn used to energize two different lighting power controllers 53.

Figure 5:
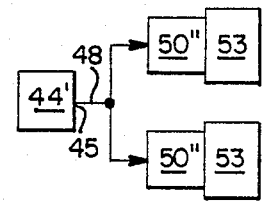

In FIG. 5 the discriminator means 44' is mounted by itself and is connected by conductor 48 from the output 45 to two separate compensator means 50" with the compensator means 50" each mounted as an integral part of their associated lighting power controllers 53. It is thus apparent that the specific location of the discriminator 44, the discriminator means 44', the compensator means 50, 50' or 50", and the lighting power controllers 53 are a matter of design choice. The choice of location of the individual portions of the overall control system are a design choice that is completely flexible and adaptable to various types of building and lighting control designs.

Figure 6:
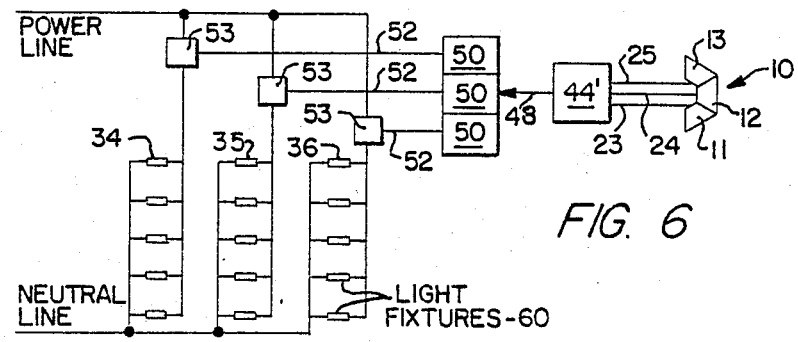
FIG. 6 is a diagram of the control system installed to control room lights of a room configuration such as that shown in FIG. 2.

In FIG. 6 the skylight sensor and control system is shown in a typical control configuration for the three rows of lights disclosed in the floor plan of FIG. 2. The light sensor means 10 again has the three segments 11, 12, and 13 which provide inputs by the conductors 23, 24, and 25 to the discriminator means 44'. The discriminator means 44' has output conductor 48 which is connected to three compensator means 50, one each for each row of lights 34, 35, and 36. Each of the compensator means 50 is connected by an appropriate conductor 52 to the lighting control means 53 which are connected to control the line power to the rows of lights 34, 35, and 36 with the individual light fixtures being disclosed schematically as element 60.

A typical control sequence for the system disclosed in FIG. 6 would provide for the lighting power controllers 53 to be set for the desired work plane lighting level for the respective rows when no daylight is available. This could be accomplished by making the adjustment at night or with curtains or blinds fully drawn. When daylight is present, the controller set-points for the controllers 50 is automatically reduced based on the skylight component of available daylight as provided by the light sensing means 10 in conjunction with the discriminator means 44'. An adjustment is made based on the distance of the rows of the windows by adjusting the compensator means 50.

During the pre-noon hours on days when objectionably high intensity east exposure direct sunlight is present, the occupants optionally may adjust their blinds as desired to suit their personal taste as to contrast, glare and visibility needs without upset to the stability of the light dimming system and under controlled light levels. In this case artificial light would be more intense. When the sun moves to a position where the east facing windows were responding primarily to skylight conditions and the blinds were open, the light dimming equipment would be able to control the light in a pattern that would provide for both energy savings and comfortable illumination in a uniform matter over the entire lighted area.

It is obvious from the present description that the light sensor means 10 can be fabricated in a number of configurations starting with two segments and increasing to any number of segments that is desired. The preferred configuration is a trapezoidal arrangement of segments, but the only requirement is that the segments be individually shielded and have a light responsive means at the collecting surface of each segment. Also, it is quite apparent that the arrangement of the discriminator means (which includes the discriminator and the auxiliary input means) can be located conveniently along with the compensator means and the lighting power controllers to properly operate the system. As such, it is apparent that the system can be modified in many ways. With this in mind, the applicant wishes to be limited in the scope of his invention solely by the scope of the appended claims.

The embodiments of the invention in which an exclusive property or right is claimed are defined as follows:

1. A skylight sensor and control system for the control of the interior illumination of an area having fenestration means and controllable artificial light source means, including: light sensor means having an active area adapted to be mounted so as to expose said active area to the exterior of said fenestration means; said light sensor means including a plurality of adjacent segments with said segments shielded from each other so that each of said segments form light gathering means; a front portion for each of said segments and a corresponding rear portion for each of said segments; said front portion of each of said segments exposed to the exterior of said fenestration means; said rear portion of each of said segments including light responsive means collecting light from said active area; discriminator means including input connection means connected to said light responsive means, and said discriminator means further having output means; said discriminator means providing said output means with a voltage from the light responsive means having the lowest level of illumination; and lighting power controller means adapted to control said artificial light source means to lower the level of illumination from said artificial light source means in response to an increase in the light at said light sensor means.

2. A skylight sensor and control system as described in claim 1 wherein said discriminator means and said sensor means are remote from one another and joined by said input connection means.

3. A skylight sensor and control system as described in claim 2 wherein said discriminator means has auxiliary signal means including auxiliary input signal means to adjust an operating level of said discriminator means in response to data provided by said auxiliary signal means.

4. A skylight sensor and control system as described in claim 2 wherein said auxiliary signal means is a time base data means and said auxiliary input signal means is time base data input means to adjust an operating level of said discriminator means in response to time and seasonal data provided by said time base data means.

5. A skylight sensor and control system as described in claim 4 wherein said lighting power controller means including compensator means and light dimmer control means; said compensator means being adjustable to select a level of said discriminator means output from said output means to operate said light dimmer control means.

6. A skylight sensor and control system as described in claim 5 wherein said lighting power controller means includes a plurality of said compensator means and said light dimmer control means to selectively control said light source means wherein said light source means includes a plurality of individual light fixtures.

7. A skylight sensor and control system as described in claim 6 wherein said light fixtures are arranged in rows which are progressively spaced from said fenestration means with each row controlled by one each of said compensator means and said light dimmer control means.

8. A skylight sensor and control system as described in claim 7 in which said compensator means controls said light fixtures at light levels dependent upon their respective distances from said fenestration means.

9. A skylight sensor and control system as described in claim 1 wherein said discriminator means and said light sensor means are mounted together including said input connection means.

10. A skylight sensor and control system as described in claim 9 wherein said discriminator means has auxiliary signal data means including auxiliary input signal means to adjust an operating level of said discriminator means in response to data provided by said auxiliary signal means.

11. A skylight sensor and control system as described in claim 10 wherein said auxiliary signal means is a time base data means and said auxiliary input signal means is time base data input means to adjust an operating level of said discriminator means in response to time and seasonal data provided by said time base data means.

12. A skylight sensor and control system as described in claim 11 wherein said lighting power controller means includes compensator means and light dimmer control means; said compensator means being adjustable to select a level of said discriminator means output from said output means to operate said light dimmer control means.

13. A skylight sensor and control system as described in claim 12 wherein said lighting power controller means includes a plurality of said compensator means and said light dimmer control means to selectively control said light source means wherein said light source means includes a plurality of individual light fixtures.

14. A skylight sensor and control system as described in claim 13 wherein said light fixtures are arranged in rows which are progressively spaced from said fenestration means with each row controlled by one each of said compensator means and said light dimmer control means.

15. A skylight sensor and control system as described in claim 14 in which said compensator means controls said light fixtures at light levels dependent upon their respective distances from said fenestration means.

* * * * *